(12) United States Patent
Rodríguez Tsouroukdissian

(10) Patent No.: US 9,522,716 B2
(45) Date of Patent: Dec. 20, 2016

(54) FLOATING OFFSHORE WIND TURBINE WITH DAMPING STRUCTURE

(75) Inventor: Arturo Rodríguez Tsouroukdissian, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 0 days.

(21) Appl. No.: 14/408,934

(22) PCT Filed: Jun. 28, 2012

(86) PCT No.: PCT/EP2012/062600
§ 371 (c)(1),
(2), (4) Date: Dec. 17, 2014

(87) PCT Pub. No.: WO2014/000802
PCT Pub. Date: Jan. 3, 2014

(65) Prior Publication Data
US 2015/0136006 A1    May 21, 2015

(51) Int. Cl.
*B63B 39/00* (2006.01)
*B63B 35/44* (2006.01)
*B63B 39/06* (2006.01)
*B63B 21/50* (2006.01)

(52) U.S. Cl.
CPC ............... *B63B 39/00* (2013.01); *B63B 21/50* (2013.01); *B63B 35/44* (2013.01); *B63B 39/06* (2013.01); *F03D 13/20* (2016.05); *B63B 2035/446* (2013.01); *F05B 2240/93* (2013.01); *F05B 2240/95* (2013.01); *Y02E 10/727* (2013.01)

(58) Field of Classification Search
CPC .......... B63B 21/50; B63B 39/00; B63B 39/02; B63B 35/44; B63B 39/06; F03D 11/04
USPC ............................ 114/121, 293; 290/44, 55
See application file for complete search history.

(56) References Cited

U.S. PATENT DOCUMENTS

| | | | |
|---|---|---|---|
| 9,446,822 B2 | 9/2016 | Roddier et al. | |
| 2005/0206168 A1 | 9/2005 | Murakami et al. | |
| 2011/0037264 A1* | 2/2011 | Roddier | B63B 35/44 290/44 |
| 2011/0126750 A1* | 6/2011 | Leverette | B63B 35/4413 114/265 |

FOREIGN PATENT DOCUMENTS

| | | |
|---|---|---|
| DE | 102010040887 | 3/2012 |
| JP | 2011-521820 | 7/2011 |
| JP | 2015-513046 | 4/2015 |
| WO | WO 2010/019050 A1 | 2/2010 |
| WO | WO 2013/155521 A1 | 10/2013 |

OTHER PUBLICATIONS

Japanese Office Action, Jul. 19, 2016.

* cited by examiner

*Primary Examiner* — Lars A Olson
(74) *Attorney, Agent, or Firm* — Dority & Manning, P.A.

(57) ABSTRACT

An offshore wind turbine comprising a buoyancy structure intended to provide a buoyancy force to support the wind turbine, wherein said buoyancy structure comprises at least one floater tank and a damping structure extending radially outward from the floater tank to damp forces due to heave, pitch or roll.

20 Claims, 16 Drawing Sheets

FLOATING OFFSHORE WIND TURBINE WITH DAMPING STRUCTURE

The present invention relates to floating offshore wind turbines.

BACKGROUND ART

Offshore wind turbines are being developed that instead of resting on fixed-bottom support structures have a floating support structure.

Several configurations have been proposed for the floating or buoyancy structures: many of these employ floater elements in the form of hollow floater tanks that in use are arranged substantially below the mean sea level and provide a buoyancy force to support the wind turbine. Ballast and/or mooring lines anchored to the seabed are provided for achieving stability.

In some of these floating wind turbines, the buoyancy structure is designed to provide an excess buoyancy force and is maintained floating under the mean sea level by taut mooring lines tensioned by the excess buoyancy force.

For example, concepts have been developed such as the "Taught Leg Buoy" (TLB) floating wind turbine, with a slender cylindrical buoy and at least two tensioned mooring lines, inclined relative to the seabed and connected to gravity anchors and to the buoy; or such as the "Tension Leg Platform" (TLP) floating wind turbine, in which the tensioned mooring lines are substantially vertical and are connected between gravity anchors on the seabed and arms or braces extending radially outwards with respect to the vertical axis of the wind turbine. The TLP arms may be part of the buoyancy structure, for example in the form of hollow spokes that extend radially outward from a hollow central hub, or may be arranged above the sea level, in which case the buoy may be a slender cylindrical tank like in the TLB concept.

The buoyancy structures of a floating offshore wind turbine (FOWT) is subject to several loads, such as for example the weight of the wind turbine itself, impacts, forces exerted by waves, currents and tides, and, depending on the configuration of the wind turbine, also aerodynamic forces associated with the wind, rotor rotation, etc. In the presence of such loads floating wind turbines may have a tendency to destabilize.

Furthermore, floating offshore wind turbines compared to their fixed substructure counterparts i.e. the monopile, jacket, tripod, or gravity based, may have a completely different dynamic response. Offshore wind turbines are highly dependent on the boundary conditions established by the cables anchored at the bottom and water (sea or lake). On the one hand, these types of buoyancy structures are subject to large displacements at the tower base (surge, sway, heave), which may affect the dynamic response of the nacelle-rotor-assembly due to elevated accelerations. On the other hand, they are subject to large rotations (roll, pitch, yaw) at the tower base, which may compromise the structural integrity of both the buoyancy structure and the tower, with the danger of ultimate collapse.

The aforementioned loads may cause a FOWT to oscillate. In order to stabilize a FOWT with such a buoyancy structure, several solutions are possible. One example solutions is to reinforce the buoyancy structure by adding ballast at the bottom of the floater tanks. Another example is to provide extra mooring lines which are put under tension by providing an excess buoyancy to the floater tanks. A combination of both solutions is also possible.

However, these solutions increase material significantly. As the weight of the buoyancy structure goes up, so does the cost of manufacture and installation.

It would be desirable to provide an offshore wind turbine in which the above drawbacks are at least partly solved.

SUMMARY

The invention relates to offshore wind turbines comprising a buoyancy structure intended to provide a buoyancy force to support the wind turbine, wherein the buoyancy structure comprises at least a floater tank.

According to a first aspect of the invention a damping structure extends radially outward from the floater tank wherein at least a proximal side of the damping structure is hinged to the floater tank. The damping structure is adapted to counteract any forces due to heave, pitch and roll. Whenever such a force is applied to the FOWT, at least a portion of the damping structure folds towards the floater tank in such a way as to counteract the applied force. The damping structure may comprise a number of separate or interconnected pieces in order to counteract simultaneous combined forces from any direction.

In one aspect, the damping structure comprises a plurality of damping braces, each hinged to the floater tank, and a plurality of damping sheets. The damping sheets may be made of deformable material, having a first and a second side attached to a first and a second adjacent damping braces. The damping sheets substantially cover an annular area defined by the floater tank and the two adjacent braces. In some embodiments the damping sheets may be made of rubber. As a force is applied to the FOWT, the FOWT may move and/or oscilate. The damping sheets move up and down with respect to the floater tank as flaps and provide the necessary damping effect to the FOWT. The damping braces may control the movement of the damping sheets, that is, the upper and lower limit of movement of each damping sheet.

In another aspect, the damping structure comprises a damping plate structure, the damping plate structure comprising at least one annular section arranged in an annulus configuration around the floater tank, wherein a proximal side of each annular section is hinged to the exterior surface of the floater tank. The damping plates are relatively thin and stiff structures. As a result, only little mass is added to the overall buoyancy structure mass. Therefore, only negligible hydrodynamic forces are induced due to this added structure. The damping structure may be placed vertically during transport, and lowered during installation. As a force is applied to the FOWT, the damping plates fold towards the floater tank providing the necessary damping force to counteract the oscillation forces.

In some embodiments the damping plate structure comprises at least three annular sections. In the case of three annular sections, each annular section is up to 120° wide. The number of annular sections is selected based on the force directions that are expected for each FOWT.

In some embodiments at least one annular section is hinged to the floater tank with one or more hinges that allow movement of the annular section only around an axis that coincides with a horizontal tangent line of the floater tank.

In other embodiments at least one annular section is hinged to the floater tank with a ball-and-socket hinge.

In some embodiments each hinge may include a damping device to better control the damping effect.

In another aspect, the damping structure further comprises a plurality of tethering elements each at one end hinged to a distal part of the damping structure and at another end attached to the floater tank. The tethering element may be used to control the movement of the damping structure.

In some embodiments the damping structure may be at the bottom of the floater tank.

In some embodiments each tethering element comprises at least a damping device. The damping devices may be internal or external to the floater tank. Internal damping devices are beneficial because they are protected from wind and water. External damping devices are easier to install and inspect. Selection is made based on the characteristics of each FOWT project.

When the damping device is attached to the interior of the floater tank and the damping structure is tethered to the buoyancy structure with a cable through a water impermeable guide element, such as a J-tube.

In some embodiments the damping device is passive and in others is active or semi-active.

In some embodiments the tethering element simply comprises a chain and the damping device may be a chain locking system to control the angular movement of the damping structure. In other embodiments the damping device may be a hydraulic damper.

In embodiments employing an active or semi-active damping device, the offshore wind turbine further comprises one or more sensors, wherein data collected by the sensors is used in the control of the active or semi-active damping device. A semi-active damping device may be a magnetorheological fluid damper or an electrorheological fluid damper.

One skilled in the art may appreciate that any kind of damping device (e.g. hydraulic, pneumatic, solid friction, rotational inertia-viscous dampers, rotational friction dampers etc.) may be used within the scope of the present invention.

A passive damper system generally has a non-variable (constant) damping coefficient. In a semi-active damper system, the damping coefficient may be varied with a control system. In an active damper system, the damping device is actively steered, e.g. by increasing or decreasing pressure in a fluid chamber. A semi-active damper system may be formed e.g. by a variable-orifice viscous damper, a variable stiffness damper, a variable-friction damper or a controllable fluid damper. A preferred controllable fluid damper is a magnetorheological fluid damper. In magnetorheological fluid dampers, the damper fluid contains metallic particles. The damper's damping coefficient can be controlled very quickly by an electro-magnet. A control system may thus send control signals to an electro-magnet which can increase or decrease the damping coefficient. An aspect of semi-active and active dampers is that they may be controlled to adapt to instantaneous load conditions. For example, under a high or sudden aerodynamic load, the dampers' damping coefficient may be suitably adapted.

Another controllable fluid damper that may advantageously be used is e.g. an electrorheological fluid damper. Electrorheological fluids are suspensions of fine particles in an electrically insulating fluid. The viscosity of these fluids may be changed reversibly and very quickly in response to an electric field. In such a damper, the friction coefficient can thus be varied by applying an electric field.

In all embodiments the angle between the damping structure and the floater tank is adjustable according to the amount of damping required due to heave, pitch or roll forces.

In some embodiments, during operation, the angle between the damping structure and the floater tank may be between 60° and 90°.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
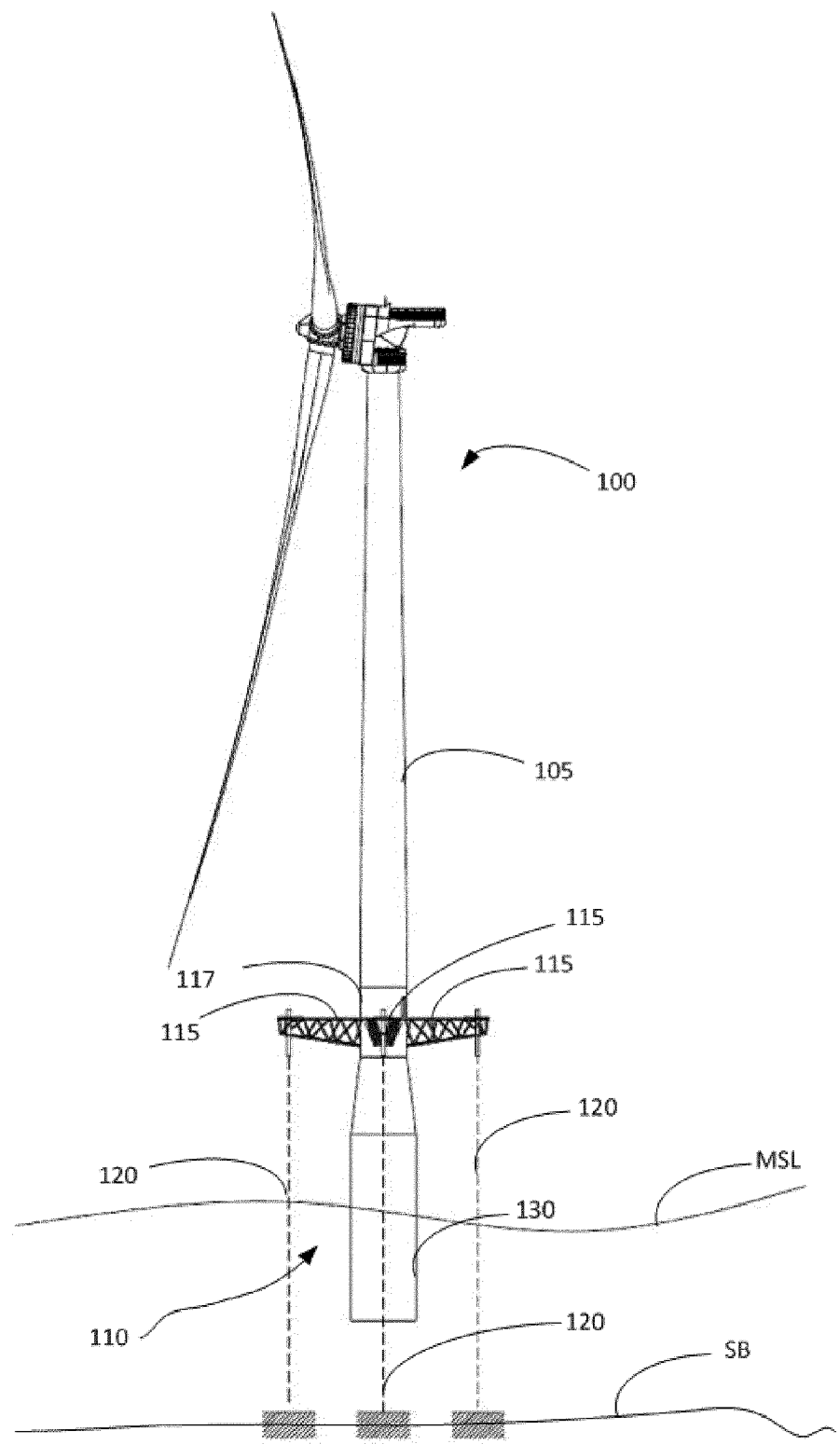
FIG. 1 shows schematically a side view of an offshore wind turbine in which embodiments of the present invention may be applied.

FIG. 1 shows an offshore wind turbine, and more particularly a floating wind turbine of the TLP (Tension Leg Platform) type.

The offshore wind turbine 100 comprises a wind tower and a buoyancy structure 110, with at least one floater tank 130. The buoyancy structure 110 may be designed such as to remain submerged in a position above the sea bed SB and below the mean sea level MSL, to provide an upward thrust for supporting the weight of the wind turbine and other loads.

The floater tank 130 may have a substantially cylindrical shape, such as shown in FIG. 1, and may have a diameter that is smaller than its length. For example, the floater tank 130 may be around 20 m in length and have a diameter of between 6 and 12 m. This kind of buoyancy structures are sometimes referred to as "spar-buoy".

The floater tank 130 may have a central geometric axis (here the vertical axis of the cylinder), and the floater tank may be arranged such that this axis is substantially or generally aligned with the axis of the wind turbine tower, i.e. the cylindrical floater tank 130 may be arranged substantially under the wind turbine, as shown.

The wind turbine may be provided with three braces 115, extending radially outward from a wind turbine supporting structure 117, at a height above the mean sea level; a mooring line 120 may be attached to each of the braces 115 at one end and to the seabed at the other end. The supporting structure 117 is arranged between the buoyancy structure and the tower of the wind turbine; in some configurations, such a supporting structure is known as "transition piece".

Further mooring lines (not shown) may be arranged between the lower end of the floater tank and the sea bed, and/or mooring lines 120 may be attached to the sea bed in such positions as to be inclined instead of vertical.

Figure 2:
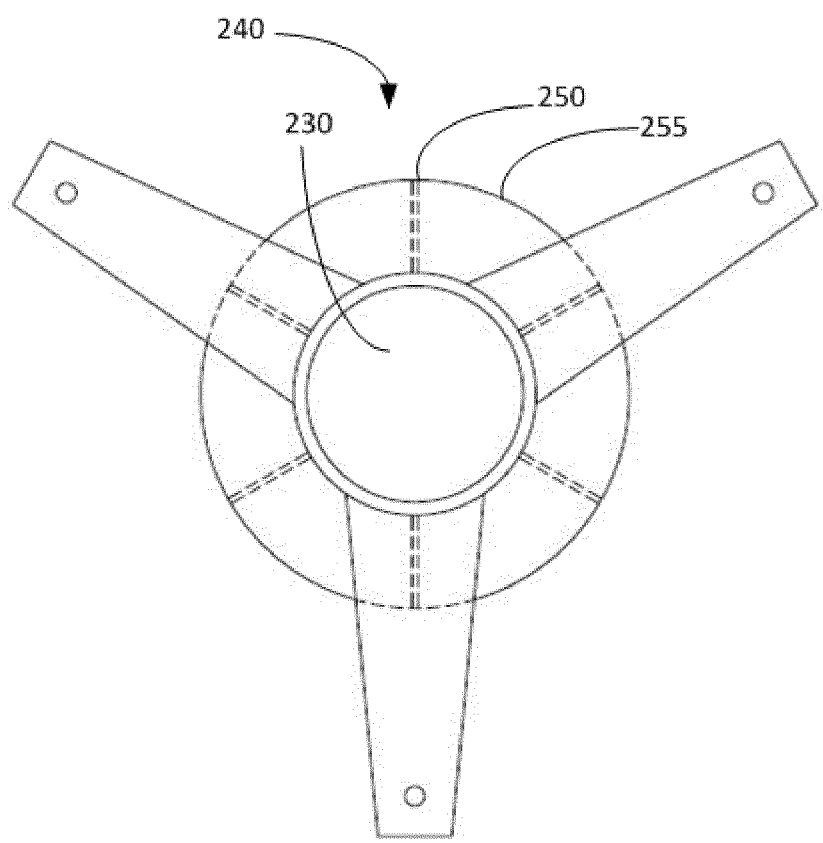
FIG. 2 shows schematically in perspective view a detail of an offshore wind turbine to which a damping structure has been applied, having damping braces with equal inclination and damping sheets, according to an embodiment.
Figure 2A:
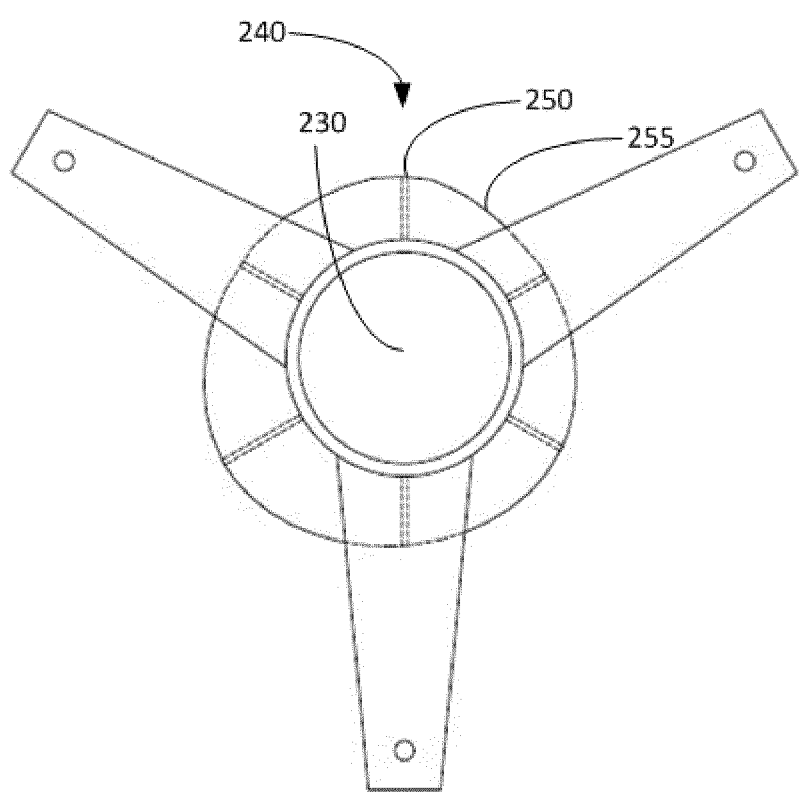
FIG. 2A shows schematically in perspective view a detail of an offshore wind turbine to which a damping structure has been applied, having damping braces with unequal inclination and damping sheets, according to an embodiment.

FIG. 2 shows schematically in perspective view a detail of an offshore wind turbine, according to an embodiment, comprising a damping structure having damping braces with equal inclination and damping sheets has been applied. Buoyancy structure 210 comprises floater tank 230 and damping structure 240. Damping structure 240 comprises damping braces 250 and damping sheets 255. Damping braces 250 may be steel braces extending radially outward from the floater tank and their proximal end is hinged to floater tank 230 with hinges. Their distal end may be suspended by the floater tank with a tethering element such as a cable. Damping sheets 255 are each deployed between two adjacent damping braces and are attached to the adjacent braces so as to substantially extend over an annular area defined by the floater tank and the two adjacent damping braces. The damping sheets may be made of a deformable material such as rubber. Damping sheets may be attached to damping braces with any suitable means. In one example, screws or glue may be employed although any other mechanical joint means is foreseen. In another example, the deformable material of the damping sheets may be placed between a damping brace and a steel plate as a sandwich. As a force is applied to the FOWT, the damping sheets move up and down as flaps and provide the necessary damping effect to the FOWT. The damping braces control the movement of the damping sheets, that is, the upper and lower limit of movement of each damping sheet. FIG. 2A shows the damping braces and damping sheets in an example damping position, where each damping brace, and consequently each damping sheet, has a different inclination with respect to the floater tank.

The implementation of a damping structure with damping braces and sheets provides many advantages. One advantage is that a wide area may be covered. Therefore, for damping a load relatively less angle movement is required. Another advantage is that each hinge may be controlled individually. A third advantage is that the damping structure is more responsive to force changes. That means rapid force changes that require a rapid damping response are handled faster. Finally, another advantage is that the damping response is more continuous and therefore damping is smoother since there are no discontinuities in the damping structure.

Figure 3:
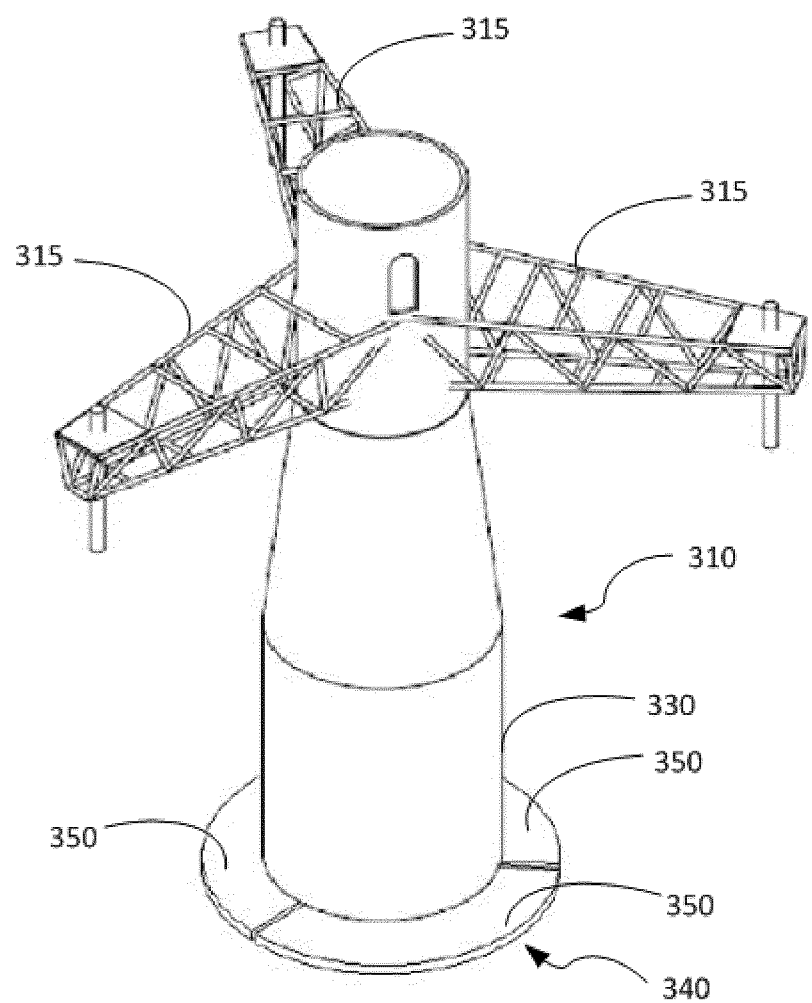
FIG. 3 shows schematically in perspective view a detail of an offshore wind turbine to which three damping plates in an open position have been applied, according to an embodiment.
Figure 3A:
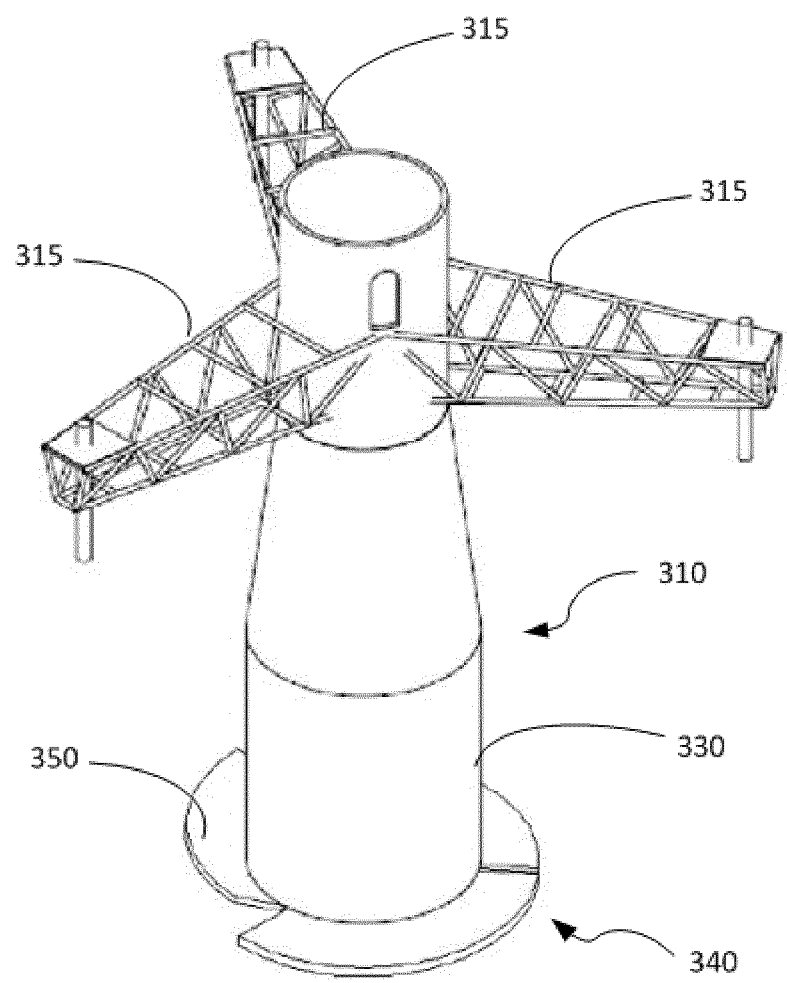
FIG. 3A shows schematically in perspective view a detail of an offshore wind turbine to which three damping plates, one of them in an inclined position, have been applied, according to an embodiment

FIGS. 3 and 3A show schematically in perspective view a detail of an offshore wind turbine to which three damping plates in an open position have been applied, according to an embodiment. Buoyancy structure 310 includes floater tank 330 and damping structure 340. Damping structure 340 includes damping plates 350. In the exemplary embodiments of FIGS. 3 and 3A three damping plates 350 are shown. Three damping plates are shown in these particular embodiments as this is the minimum number of plates for damping in all directions. One skilled in the art may appreciate that any number of damping plates may be used according to the invention. However, when a FOWT includes three support braces, each damping plate can be controlled individually when positioned between two of the support braces. Accordingly, a multiple number of three is easier to control as each damping plate can be assigned to each support brace. The overall number of damping plates is selected based on the characteristics of each FOWT in relation to the forces expected in the location of the FOWT. However, it should be understood that the more damping plates are used, the better the precision of the response of the damping structure can be.

The damping plates 350 are shown in FIG. 3 in an open position. One side (the proximal) of damping plates 350 is hinged to the bottom of floater tank 330 with hinges (not shown). At least one hinge is used for each damping plate. More hinges may be provided for each damping plate as long as they are all in the same rotational plane. The opposite (distal) side of damping plates 350 may be tethered to the floater tank by cables (not shown). As a force is applied to the FOWT, the damping plates fold towards the floater tank providing the necessary damping force to counteract the oscillation forces. FIG. 3A shows schematically in perspective view a detail of an offshore wind turbine to which three damping plates, one of them in an inclined position, have been applied, according to an embodiment. A force has been applied in the direction of the folded damping plate. As the damping plate folds oscillations due to the force applied in that direction may be dampened.

An aspect of this implementation of a damping structure with damping plates is that it is particularly simple, easy to control and implement due to its rigid nature.

Figure 4:
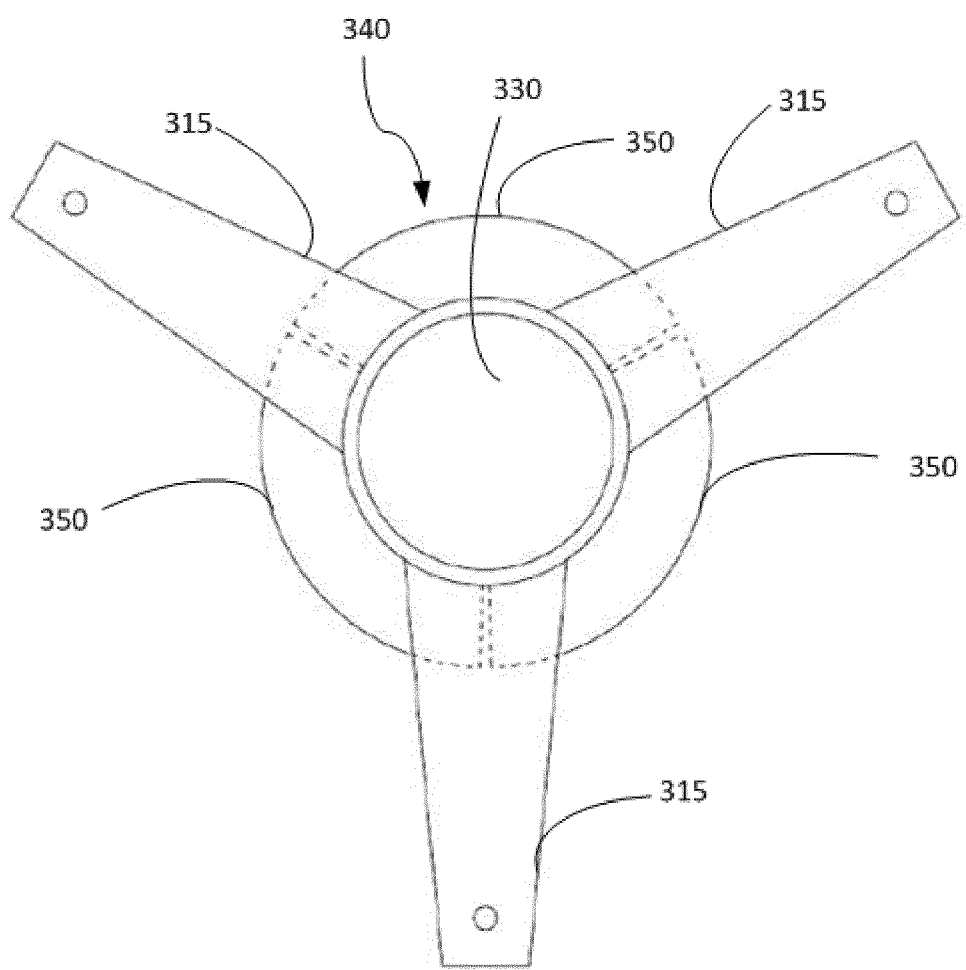
FIG. 4 shows schematically in top view a cross section of an offshore wind turbine having three damping plates, according to an embodiment.

FIG. 4 shows schematically in top view a cross section of an offshore wind turbine having three damping plates, according to an embodiment. Buoyancy structure 310 comprises floater tank 330, support braces 315 and damping plates 350. In the embodiment of FIG. 4, three damping plates are shown in an open position. Each damping plate may be up to 120 degrees wide. However, one skilled in the art may appreciate that the actual shape of the damping plates may differ according to the requirements of each specific offshore wind turbine. For example, the distal side of each damping plate may be shorter than what is shown in FIG. 4 so that the plates may fold in a closed position without colliding. In another example the plates may be as shown in FIG. 4 but when they are to be closed, they are closed successively, so that in a closed position the potentially colliding plate portions are superposed.

Figure 5:
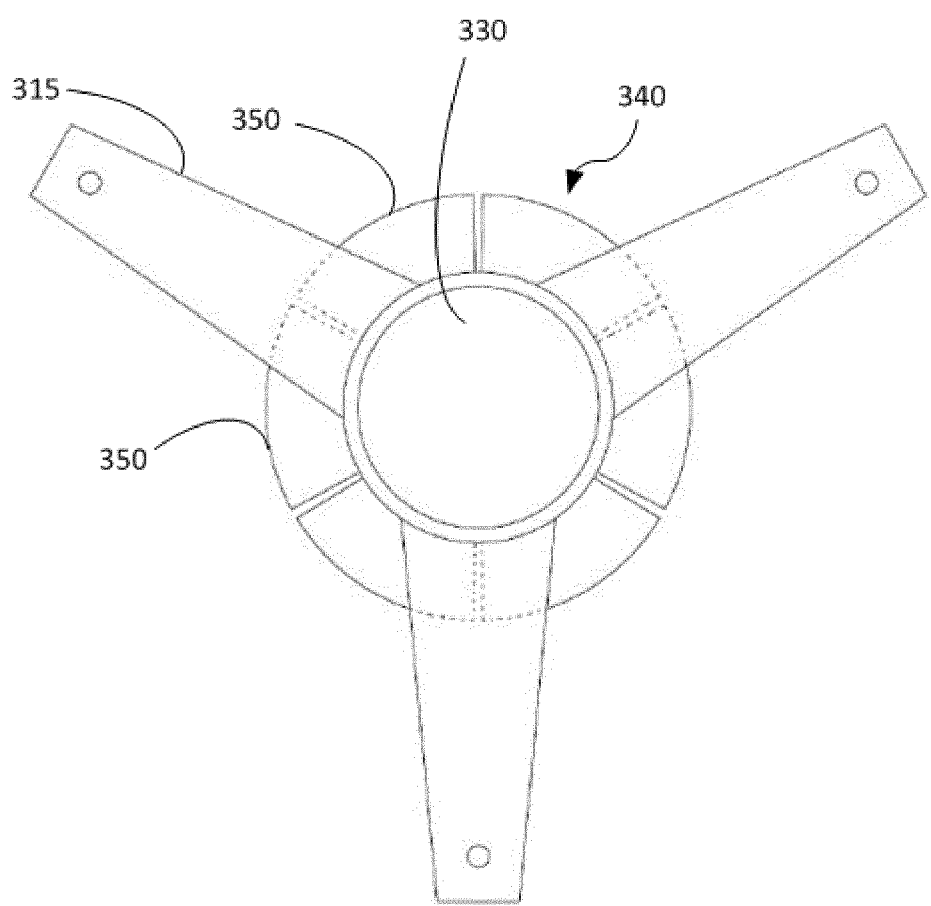
FIG. 5 shows schematically in top view a cross section of an offshore wind turbine having six damping plates, according to an embodiment.

FIG. 5 shows schematically in top view a cross section of an offshore wind turbine having six damping plates, according to an embodiment. Damping structure 340 comprises six damping plates 350. In the exemplary embodiment of FIG. 5, the six damping plates 350 are shown in an open position. Each damping plate is up to 60 degrees wide. The six damping plates are more advantageous when forces are expected from a larger number of directions. The more damping plates may provide a finer damping effect.

Figure 6:
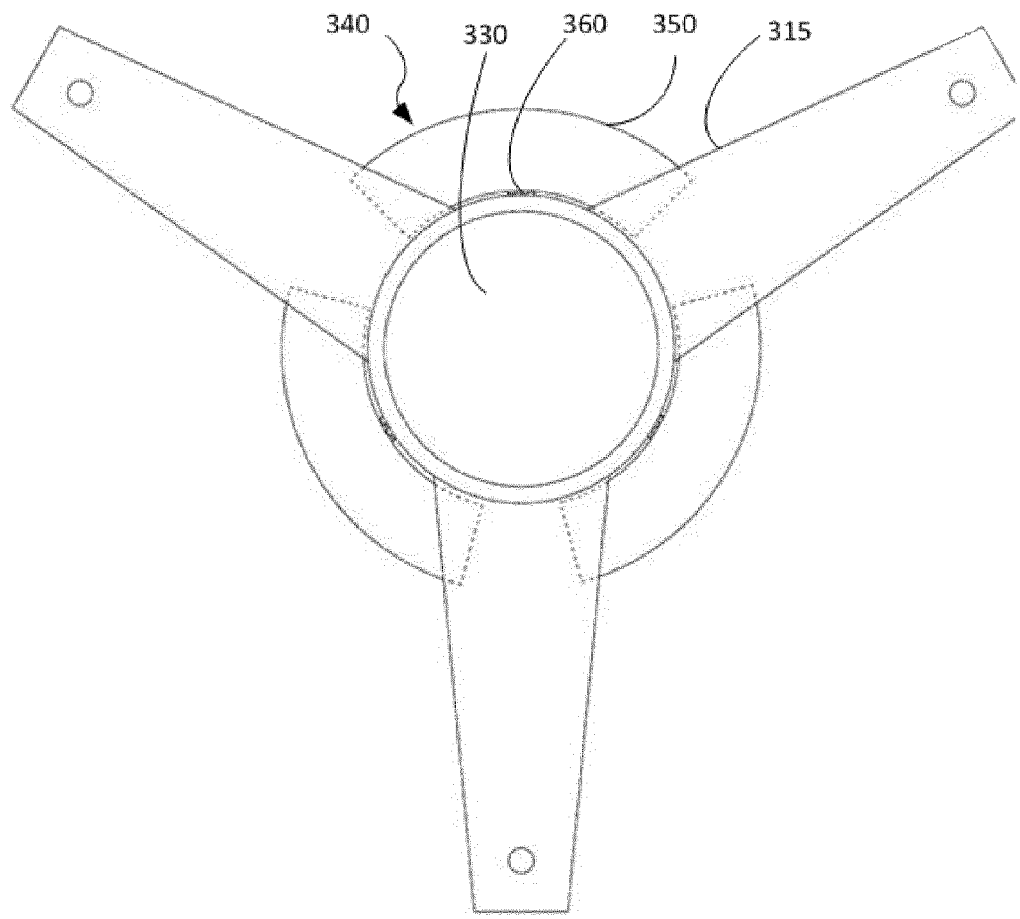
FIG. 6 shows schematically in top view a cross section of an offshore wind turbine having three spaced apart damping plates hinged to the floater tank with one barrel hinge, according to an embodiment.

FIG. 6 shows schematically in top view a cross section of an offshore wind turbine having three spaced apart damping plates each hinged to the floater tank with one hinge 360, such as a barrel hinge, according to an embodiment. Buoyancy structure 310 comprises tanker 330 and damping plates 350. Each damping plate 350 is hinged to floater tank 330 with a barrel hinge 360. Barrel hinges have the advantage that they are easier to control as they only have one degree of freedom. Furthermore they are easy and cheap to manufacture. In the exemplary embodiment of FIG. 6, the damping plates 350 are spaced apart so that the outer part of the plates do not collide when the damping plates are brought into a closed position.

Figure 7:
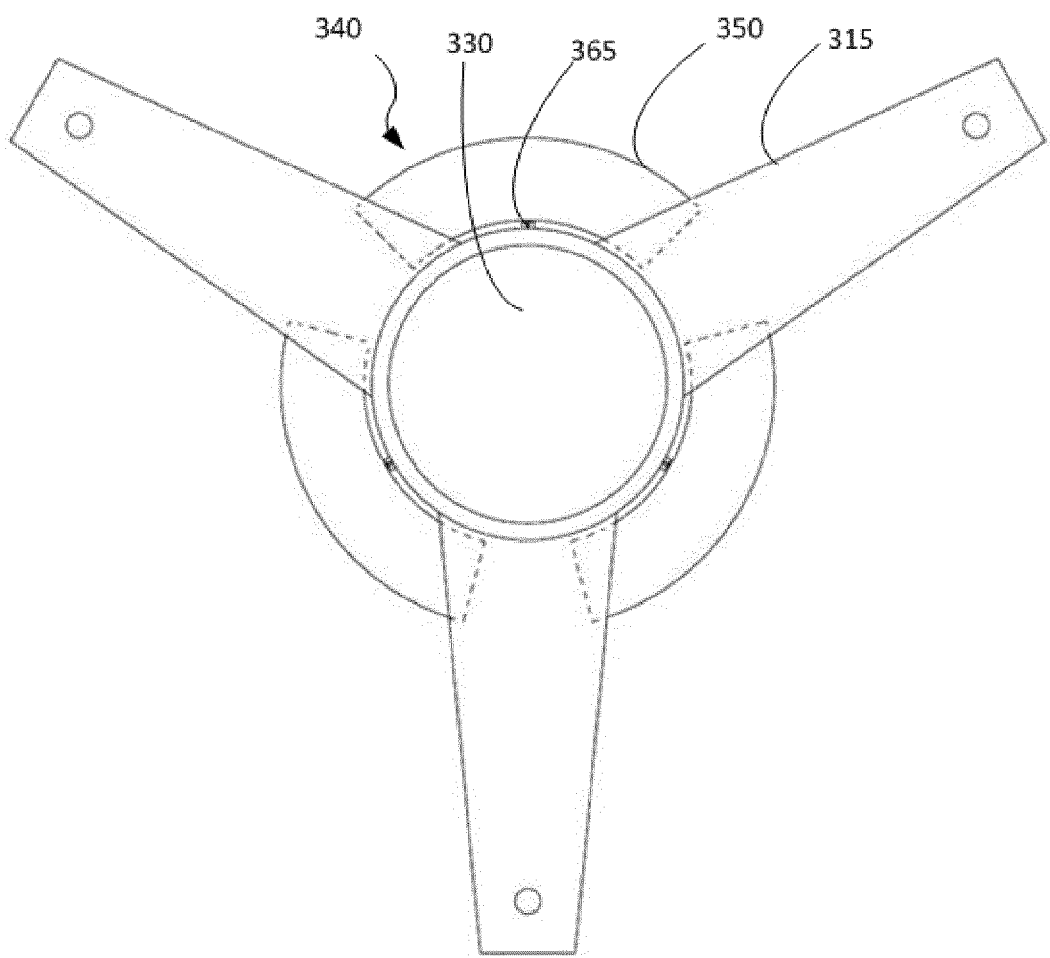
FIG. 7 shows schematically in top view a cross section of an offshore wind turbine having three spaced apart damping plates hinged to the floater tank with one ball-and-socket hinge, according to an embodiment.

FIG. 7 shows schematically in top view a cross section of an offshore wind turbine having three spaced apart damping plates each hinged to the floater tank with one ball-and-socket hinge 365, according to an embodiment. Ball-and-socket hinges can provide the damping plates with at least two degrees of freedom. Buoyancy structure 310 comprises tanker 330 and damping plates 350. Each damping plate 350 is hinged to floater tank 330 with a ball-and-socket hinge 365.

Figure 8:
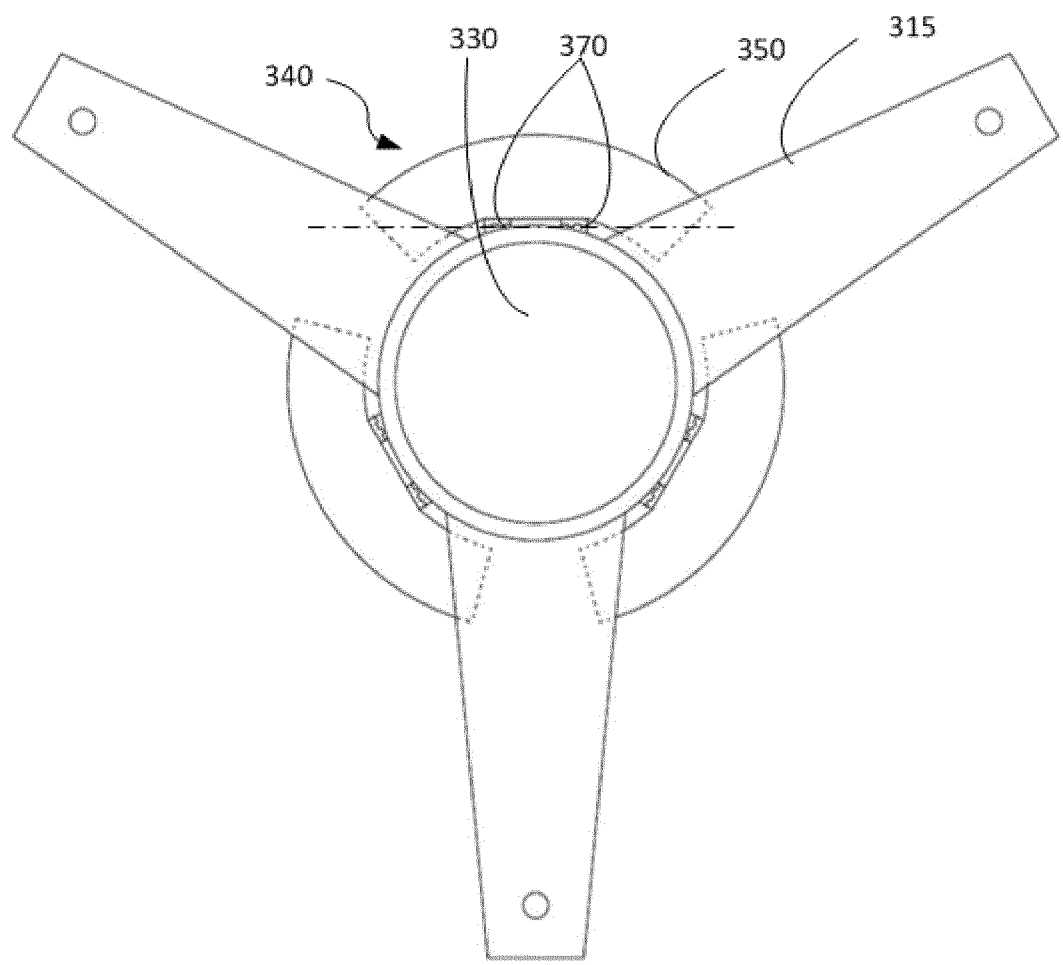
FIG. 8 shows schematically in top view a cross section of an offshore wind turbine having three spaced apart damping plates hinged to the floater tank with two barrel hinges, according to an embodiment.

FIG. 8 shows schematically in top view a cross section of an offshore wind turbine having three spaced apart damping plates hinged to the floater tank with a pair of barrel hinges 370, according to an embodiment. Buoyancy structure 310 comprises tanker 330 and damping plates 350. Each damping plate 350 is hinged to floater tank 330 with a pair of barrel hinges 370. Each pair of hinges is arranged so that the rotational plane of each hinge belonging to the pair is the same. The two barrel hinges may secure the damping structure better to the FOWT compared to having only one. They may thus be particularly suitable for larger loads caused by larger forces. Furthermore, they are preferred when larger damping plates are used or when more sea currents are expected.

Figure 9:
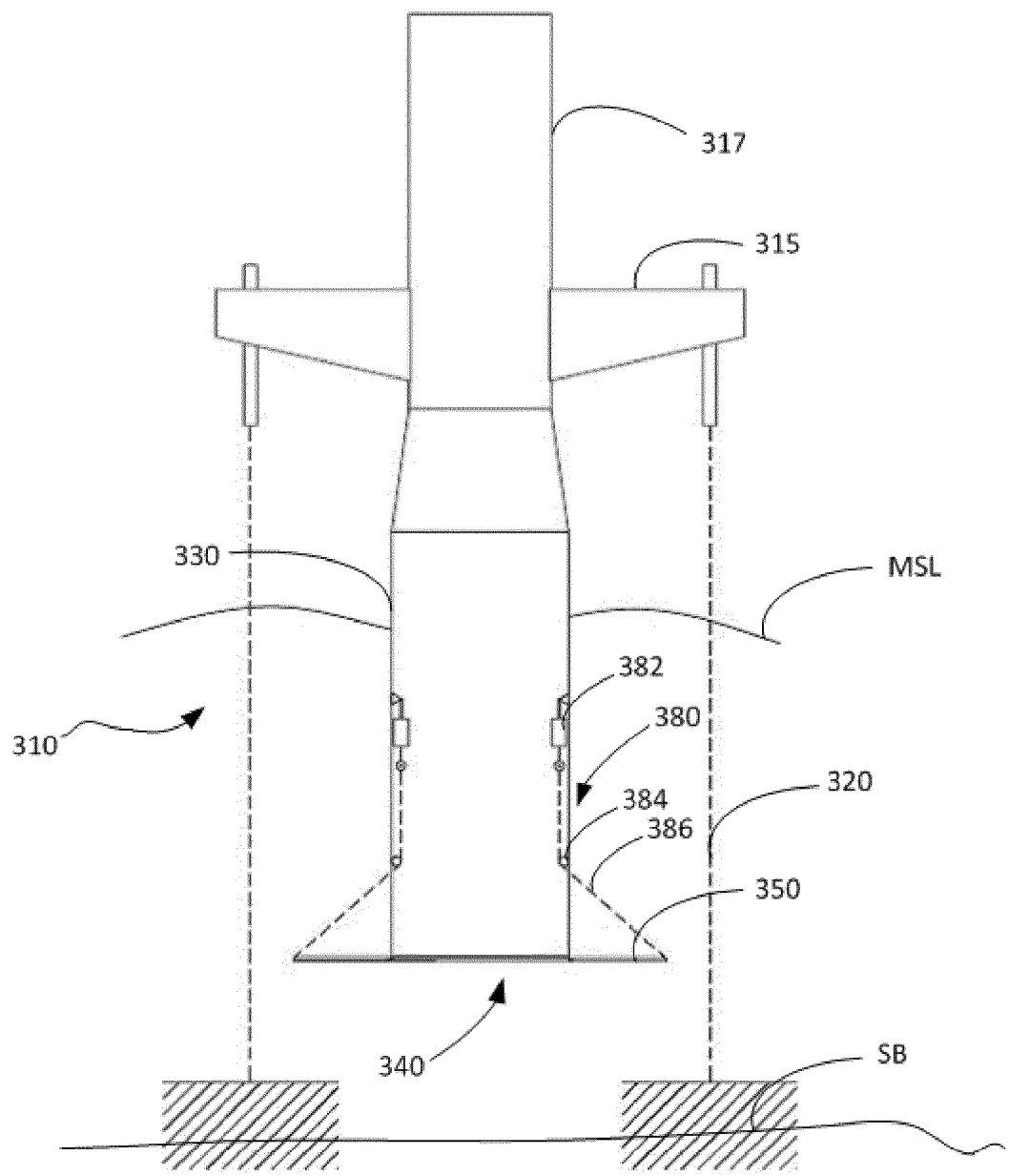
FIG. 9 shows schematically in side view an enlarged detail of an offshore wind turbine with an internal type damping structure in an open position.

FIG. 9 shows schematically in side view an enlarged detail of an offshore wind turbine with an internal type damping structure in an open position. Buoyancy structure 310 includes floater tank 330 and damping structure 340. Damping structure 340 includes damping plates 350 and tethering elements 380. Each tethering element includes a damping device 382 coupled with a cable 386. In the embodiment of FIG. 9, only a pair of damping plates 350 is shown. One skilled in the art may appreciate that, although two damping plates are shown in this particular embodiment, any number of damping plates may be used according to the invention. The damping plates 350 are shown in FIG. 9 in an open position.

One side, the proximal, of damping plates 350 is hinged to the bottom of floater tank 330 with hinges (not shown). At least one hinge is used for each damping plate. More hinges may be provided for each damping plate as long as they are all in the same rotational plane. The distal side of damping plates 350 is tethered by cables 386. Cables 386 are on one side coupled to the distal side of damping plates 350 and on the other side to damping devices 382. Damping devices 382 are placed in the interior of floater tank 330 in a fixed position. A guide 384 is provided to pivot cable 386 at the point of entry in floater tank 330. Guide 384 may comprise a J-tube to ensure that the floater tank remains watertight. Furthermore damping device 382 may be encased in a box or case inside going up so that should water leak in, it would remain in the box or case without affecting the overall integrity of the floater tank. As a force is applied to the FOWT, the damping plates fold towards the floater tank providing the necessary damping force to counteract the oscillation forces. The damping device controls the response of the damping plate to the force applied. A number of sensors (not shown) may be employed to measure the force conditions and control the characteristics of the damping device. Thereby, a better response of the damping structure is achieved. Internal damping devices are beneficial because they are protected from the wind and water.

Figure 9A:
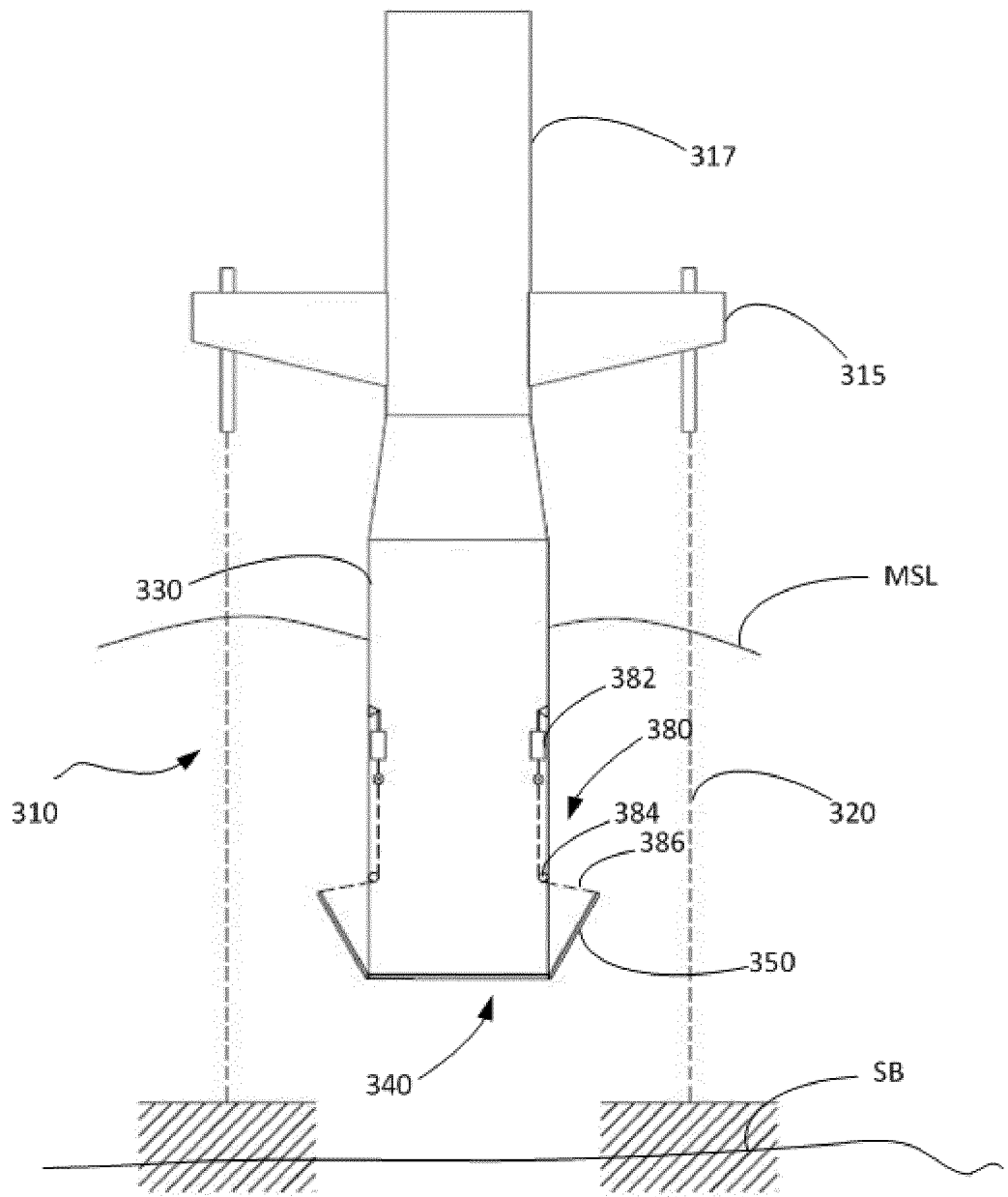
FIG. 9A shows schematically in side view an enlarged detail of an offshore wind turbine with an internal type damping structure in an inclined position.

FIG. 9A shows schematically in side view an enlarged detail of an offshore wind turbine with an internal type damping structure in an inclined position. During operation the angle between a damping plate and the floater tank may be designed to take any value. However, the operating range is expected to be between the values of 90° and 60°. This limit may be posed by the hinge connecting the damping structure to the floater tank, or by the cable or by both. In the exemplary embodiment of FIG. 9A the damping structure is depicted at an operational point of 60°.

Figure 9B:
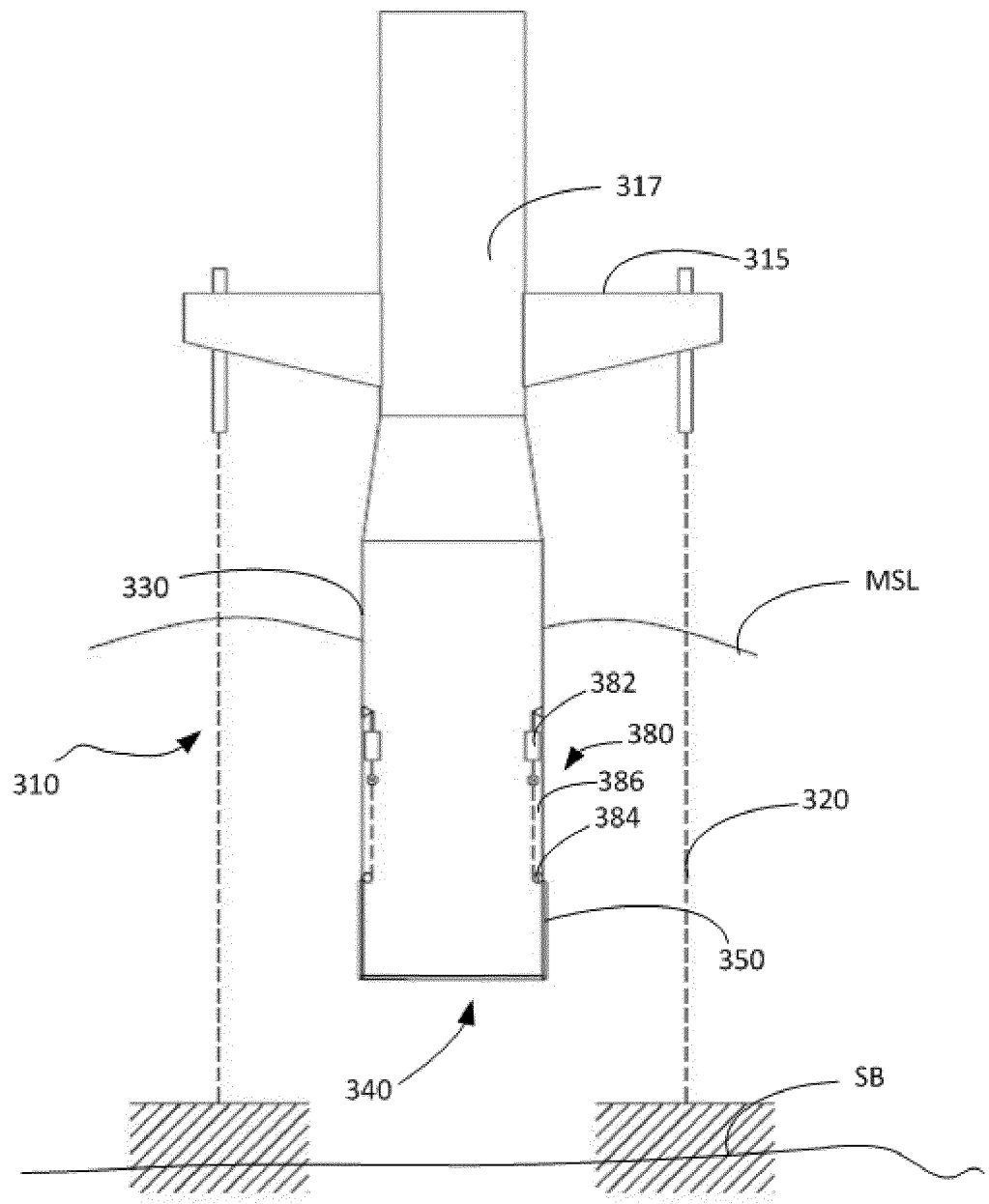
FIG. 9B shows schematically in side view an enlarged detail of an offshore wind turbine with an internal type damping structure in a closed position.

FIG. 9B shows schematically in side view an enlarged detail of an offshore wind turbine with an internal type damping structure in a closed position. Such a position is not intended as an operational position. It is perceived during transportation and maintenance as it facilitates safe access to the parts of the damping structure.

Figure 10:
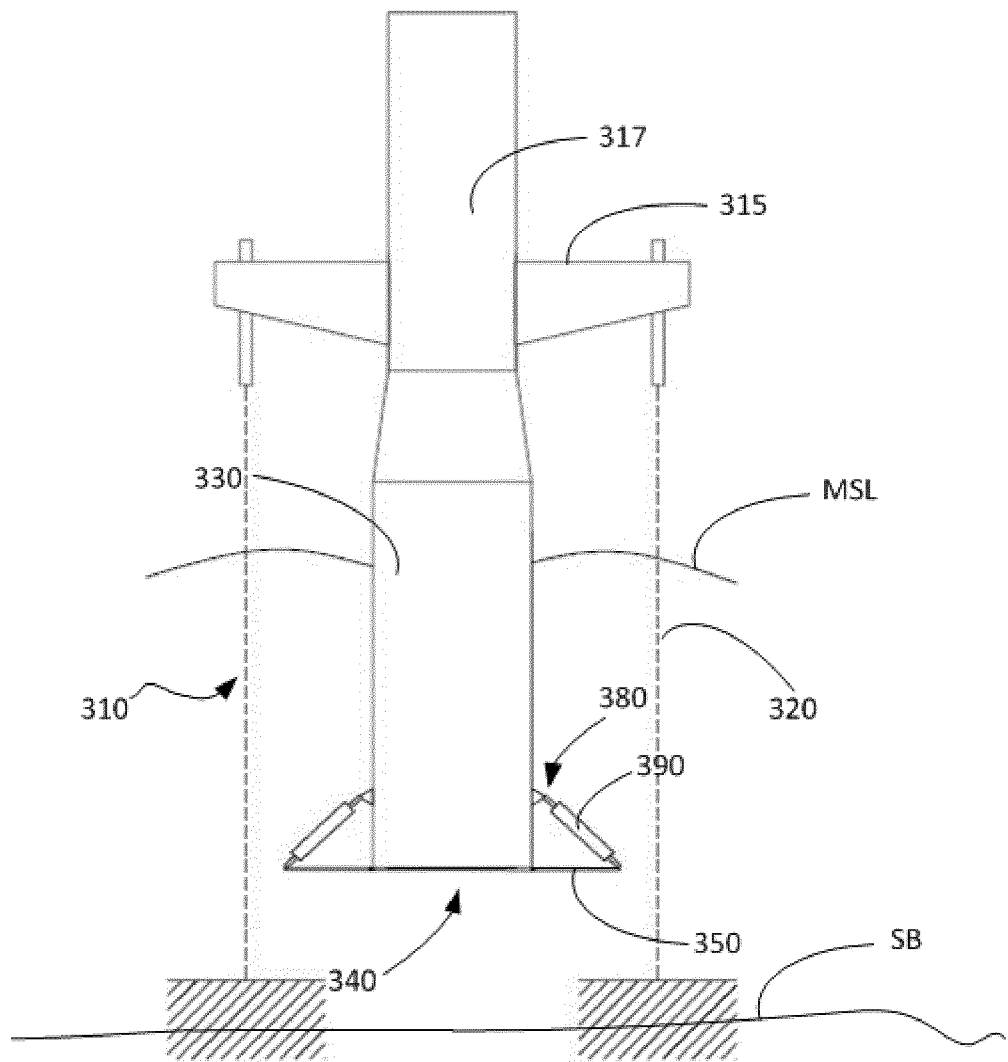
FIG. 10 shows schematically in side view an enlarged detail of an offshore wind turbine with an external type damping structure in an open position.

FIG. 10 shows schematically in side view an enlarged detail of an offshore wind turbine with an external type damping structure in an open position. Buoyancy structure 310 includes floater tank 330 and damping structure 340. Damping structure 340 includes damping plates 350 and tethering elements 380. Each tethering element includes a damping device 390. In the exemplary embodiment of FIG. 10, only a pair of damping plates 350 is shown. One skilled in the art may appreciate that, although two damping plates are shown in this particular embodiments, any number of damping plates may be used according to the invention. The damping plates 350 are shown in FIG. 10 in an open position.

One side (proximal) of damping plates 350 is hinged to the bottom of floater tank 330 with hinges (not shown). At least one hinge is used for each damping plate. More hinges may be provided for each damping plate as long as they are all in the same rotational plane. The opposite (distal) side of damping plates 350 is tethered by tethering element 380. Tethering element 380 comprises damping device 390. Damping devices 390 are placed at the exterior of floater tank 330. Exterior damping plates are easier to install and provide easier access for inspection and maintenance.

Figure 10A:
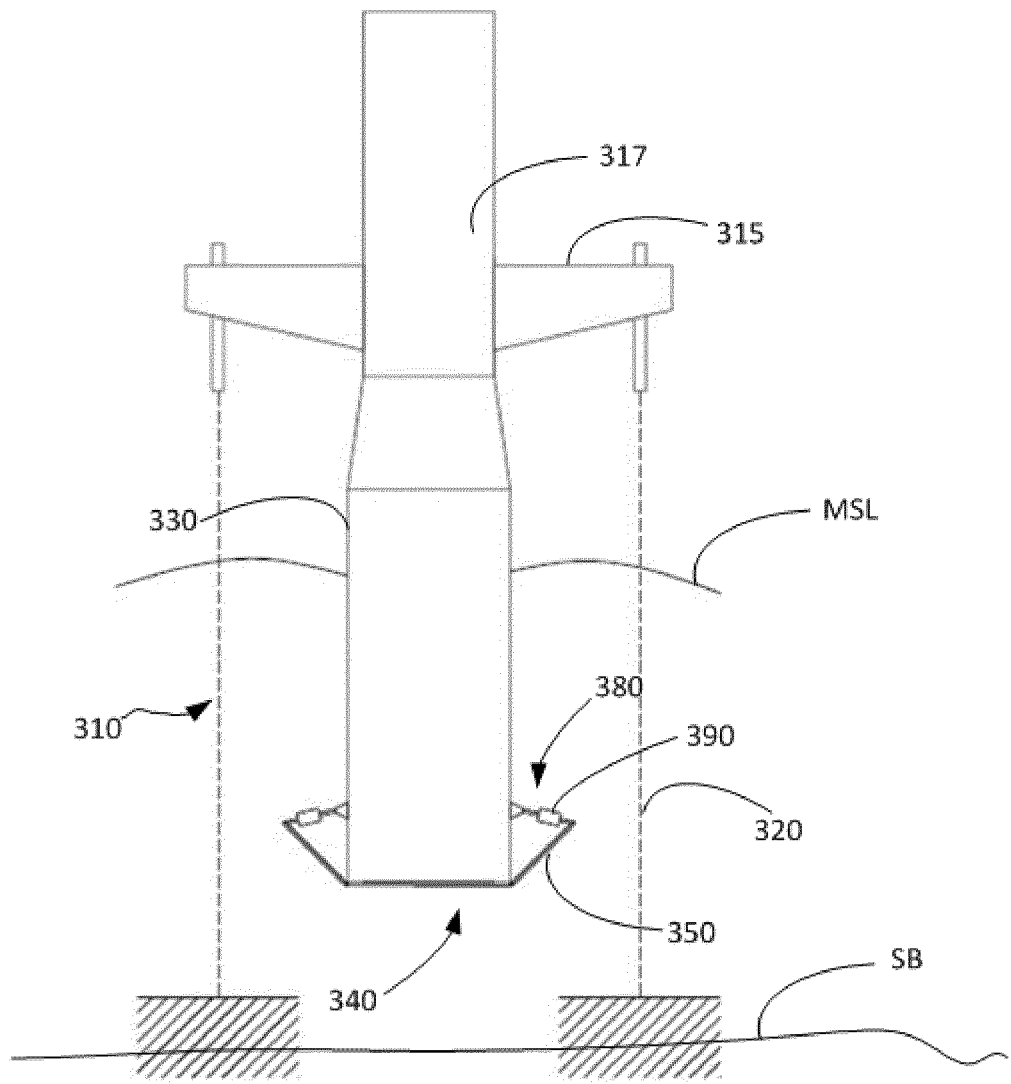
FIG. 10A shows schematically in side view an enlarged detail of an offshore wind turbine with an external type damping structure in an inclined position.

FIG. 10A shows schematically in side view an enlarged detail of an offshore wind turbine with an external type damping structure in an inclined position. During operation the angle between a damping plate and the floater tank may be designed to take any value. However, the operating range is expected to be between the values of 90° and 60°. As a force is applied to the FOWT, the damping plates fold towards the floater tank providing the necessary damping force to counteract the oscillation forces.

Figure 10B:
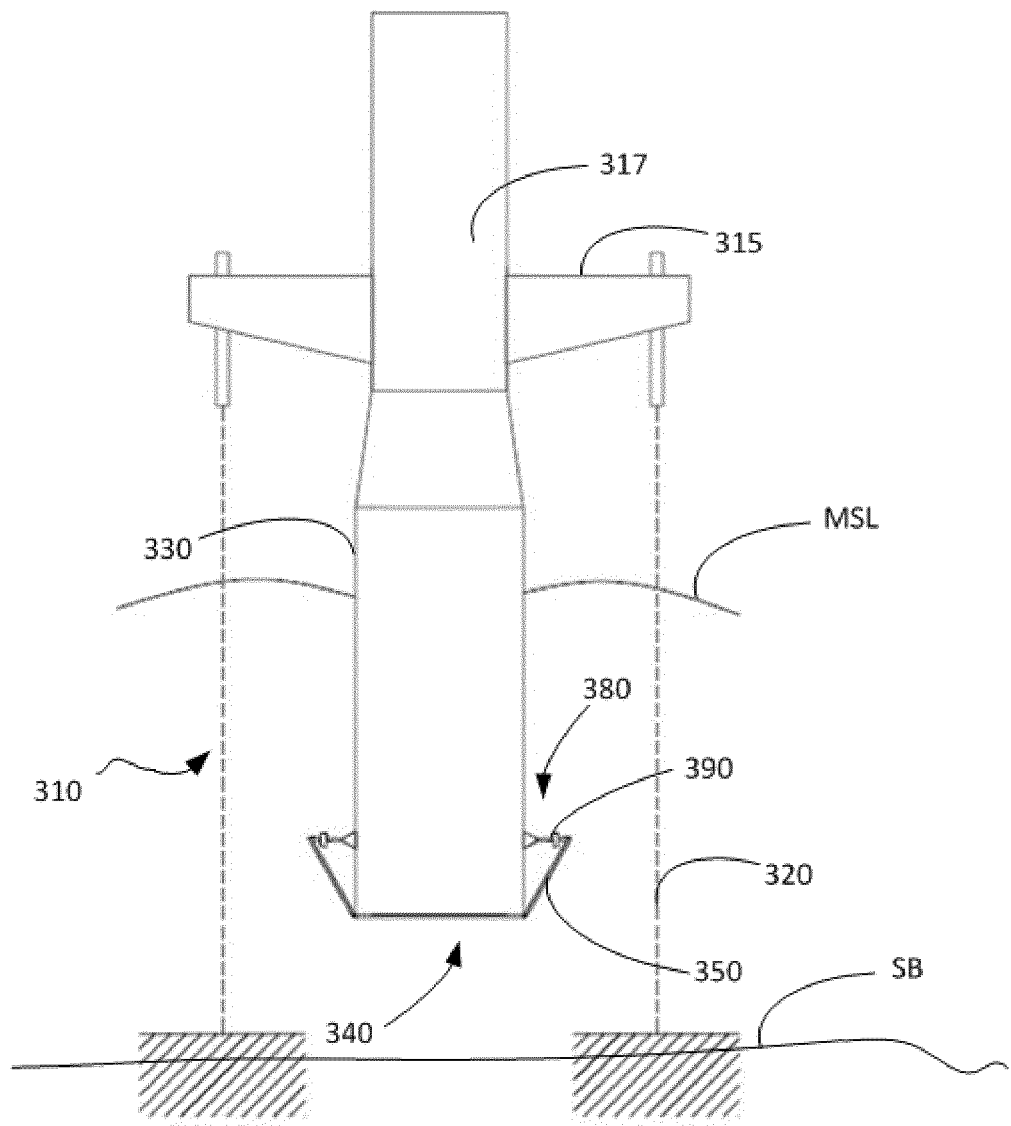
FIG. 10B shows schematically in side view an enlarged detail of an offshore wind turbine with an external type damping structure in a closed position.

FIG. 10B shows schematically in side view an enlarged detail of an offshore wind turbine with an external type damping structure in a closed position. It is noted that, as the damping devices are external, it is not possible to position the damping plates in a fully closed position for transportation and maintenance, as in the internal type embodiment described with reference to FIG. 9-9B. A possible solution for fully closing the damping plates is to install the damping devices after transportation and remove them during maintenance.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. An offshore wind turbine, comprising:
    a buoyancy structure intended to provide a buoyancy force to support the wind turbine, wherein the buoyancy structure comprises:
    a floater tank; and
    a damping structure extending radially outward from the floater tank,
    the damping structure comprising a plurality of damping braces and a plurality of damping sheets, wherein a proximal end of each the plurality of damping braces is hinged to the floater tank, each of the damping sheets having a first side and a second side attached to a first and a second adjacent damping brace, respectively, and each of the damping sheets having a solid cross-section substantially covering an annular area defined by the floater tank and the two adjacent braces.

2. The offshore wind turbine according to claim 1, wherein the plurality of damping sheets are made of deformable material.

3. The offshore wind turbine according to claim 2, wherein each damping sheet is made of rubber.

4. The offshore wind turbine according to claim 1, wherein each of the damping sheets correspond to a damping plate structure, each of the damping plate structures comprising at least one annular section arranged in an annulus configuration around the floater tank, wherein a proximal side of each annular section is hinged to an exterior surface of the floater tank.

5. The offshore wind turbine according to claim 4, wherein each of the damping plate structures comprise at least three annular sections, each annular section being up to 120° wide.

6. The offshore wind turbine according to claim 5, wherein at least one annular section is hinged to the floater tank with at least one hinge that allows movement of the annular section only around an axis that coincides with a horizontal tangential line of the floater tank.

7. The offshore wind turbine according to claim 6, wherein each hinge includes a damping device.

8. The offshore wind turbine according to claim 1, wherein the damping structure further comprises a plurality of tethering elements each at one end hinged to a distal part of the damping structure and at another end attached to the floater tank.

9. The offshore wind turbine according to claim 8, wherein the proximal side of the damping structure is hinged to the floater tank at a first cross section and each tethering element is attached to the floater tank at a second cross section, wherein the second cross section is different from the first cross section.

10. The offshore wind turbine according to claim 8, wherein each tethering element comprises at least a damping device.

11. The offshore wind turbine according to claim 8, wherein the damping device is passive.

12. The offshore wind turbine according to claim 9, wherein each tethering element further comprises a chain and the damping device is a chain locking system to control the angular movement of the damping structure.

13. The offshore wind turbine according to claim 9, wherein the damping device is a hydraulic damper.

14. The offshore wind turbine according to claim 8, wherein the damping device is semi-active.

15. The offshore wind turbine according to claim 14, further comprising one or more sensors, wherein data collected by the sensors is used in the control of the semi-active damping device.

16. The offshore wind turbine according to claim 14, wherein the damping device is a magnetorheological fluid damper or an electrorheological fluid damper.

17. The offshore wind turbine according to claim 1, wherein the angle between the damping structure and the floater tank is adjustable according to the amount of damping required to counteract heave, pitch or roll forces.

18. The offshore wind turbine according to claim 1, wherein during operation the angle between the damping structure and the floater tank is between 60° and 90°.

19. The offshore wind turbine according to claim 1, wherein during non-operation the angle between the damping structure and the floater tank is between 0° and lower than 60°.

20. The offshore wind turbine according to claim 1, wherein the floater tank is substantially cylindrical.

* * * * *